United States Patent Office 3,021,197
Patented Feb. 13, 1962

3,021,197
PREPARATION OF DIBORANE
Charles C. Clark, Kenmore, and Frank A. Kanda and Aden J. King, Syracuse, N.Y., assignors, by mesne assignments, to Olin Mathieson Chemical Corporation, a corporation of Virginia
No Drawing. Filed Nov. 20, 1956, Ser. No. 623,512
2 Claims. (Cl. 23—204)

This invention relates to the preparation of boron hydrides and, more in particular, provides a method for the production of diborane.

It has been heretofore proposed to produce diborane by reacting boron trifluoride and lithium hydride in an ether solution. This method suffers from various disadvantages from the standpoint of the materials involved. Thus, the method employs lithium hydride, a hydride of a metal which is not found widely distributed in nature. Hence, it would be desirable to have available a method for the production of diborane based upon the use of a more plentiful starting material. Moreover, the known method involves the use of diethyl ether, a solvent which is hazardous to handle.

In accordance with the present invention, a method has been devised whereby diborane can be produced in good yield in a controllable reaction by the hydrogenation of polymeric boron monoxide. Polymeric boron monoxide is readily produced as described in patent application Serial No. 595,074, filed July 2, 1956, in the name of Frank A. Kanda. In that application, polymeric boron monoxide is produced by heating boron trioxide or a metal borate in admixture with a molar excess of boron at an elevated temperature and under a high vacuum. Boron monoxide vapor is sublimed from the reaction mixture and the vapor is contacted with a cooled surface whereby solid polymeric boron monoxide is formed. Generally, a molar ratio of boron trioxide or metal borate to boron of from 1:2 to 1:12, a reaction temperature between 800° C. and 1800° C., a reaction pressure between $10^{-1}$ and $10^{-6}$ mm. of mercury and a cooling temperature below 700° C. are utilized. Among the metal borates which can be used in accordance with the method of application Serial No. 595,074 are the tetraborates and metaborates of alkali metals, alkaline earth metals and magnesium, for example, borax, sodium metaborate and $(MgO)_2 \cdot B_2O_3$.

The solid reactant, polymeric boron monoxide, is charged to the reactor preferably in the form of a homogeneous pellet or slug. In addition to the solid reactant, hydrogen gas is supplied to the reaction. The hydrogen requires no special purification. Commercial hydrogen as supplied in cylinders under pressure is satisfactory. Hydrogen can be supplied to the reaction in the form of a hydrocarbon, for example, methane, ethane, ethylene, propylene or mixtures thereof. Under the reaction conditions, such hydrocarbons crack to form carbonaceous products and hydrogen gas. The reaction can be carried out by heating the polymeric boron monoxide in the presence of hydrogen to a temperature of approximately 850° C. to 1500° C., preferably 1300° C., while contacting the polymeric boron monoxide with hydrogen.

The necessary heat is supplied in any suitable manner. A particularly advantageous method is by electrical induction. For this purpose, an electrically conductive material is provided to support or surround the reaction mixture and is arranged for the introduction of hydrogen gas and removal of the gaseous products. A vertical graphite tube of suitable diameter, water jacketed at one end and arranged to support the reaction mixture at the other, has been found satisfactory. The graphite tube is surrounded by a fused silica jacket which, in turn, is jacketed and water cooled. Hydrogen gas is introduced into the water-cooled end of the graphite tube contacting the reaction mixture and then passed into an ordinary glass system for collection of the products. The outer jacket is surrounded by turns of an induction coil suitably supplied with high frequency current.

The diborane product is separated from unreacted hydrogen and other products of the reaction by condensation at low temperature. The remaining hydrogen is suitable for recycle to the reaction zone. The principal gaseous product of the reaction is diborane. Small proportions of other boron hydrides are obtained under some conditions. These are readily removed in a cool zone before condensing the diborane product from the gas at −196° C.

*Example*

Boron, 3 g., analyzing above 90 percent B and 2 g. anhydrous $B_2O_3$ were intimately mixed and compressed into a cylindrical pellet. This was placed in a tantalum crucible fitted with a perforated lid, the crucible being suspended by means of a tatalum wire and encased in a water cooled glass envelope which was in turn connected to a vacuum system. A water cooled metal condenser was placed directly above the crucible. Induction heating was used to sublime boron monoxide onto the condenser. The charge was heated slowly under vacuum and then baked at about 900° C. for about an hour to remove any occluded moisture. No sublimation was noted at this temperature and at a pressure of $1 \times 10^{-4}$ mm. of mercury. The temperature was raised to 1100°, maintaining the pressure, and polymeric boron monoxide was collected by sublimation onto the condenser and walls of the tube. The yield (per unit time) is increased by lower pressures, higher temperatures, and with greater escaping area in the crucible. The reaction efficiency at 1300° C. amounts to a 65 percent yield of polymeric boron monoxide, based upon available boron trioxide, from a 5 g. charge heated for 2 hours at $1 \times 10^{-4}$ mm. of mercury. The polymeric boron monoxide analyzed 40.3 percent B by weight, identical with the theoretical boron content required for BO.

A Vycor (fused silica) tube about 1¼ inches in diameter and 8 inches long is arranged vertically with an exit at the top for the gaseous products of the reaction. Inserted into the fused silica tube from the bottom is a graphite cylinder ending about 2 inches below the top of the fused silica tube and extending below it. The graphite cylinder has an external diameter of about ¾ inch and an internal diameter of about ½ inch and a wall thickness of about ⅛ inch. It is retained in place by a stopper at the bottom and the extended part of the graphite has a brass water cooling jacket. A tantalum plate about 2 inches below the top of, but inside of, the graphite cylinder supports the solid mixture charged to the reaction. The silica tube is surrounded by a water jacket. At the level of the tantalum plate, the water jacket is surrounded by an induction heater comprising several turns of heavy copper tubing about ¼ inch in external diameter and cooled internally by a stream of water. The induction heater is supplied by a high frequency current.

The tantalum support is charged with 0.22 g. of polymeric boron monoxide (prepared as just described) compressed into a pellet and heated to a temperature of 1300° C. for one-half hour, while a stream of hydrogen amounting to about 1.5 to 2 liters per minute is passed through the apparatus. The exit gases are cooled in a trap at −196° C. and the uncondensed hydrogen gas is vented to the air (in operating the process continuously, the hydrogen is recycled through the reaction chamber by means of a pump). At the end of one-half hour of heating, 0.6 mg. of product has been collected. It is analyzed by means of infrared spectrum and found to be diborane.

We claim:
1. A method for the production of diborane which comprises reacting polymeric boron monoxide with gaseous hydrogen at a temperature of about 850° C. to 1500° C. and recovering diborane from the gaseous reaction effluent.

2. The method of claim 1 wherein said temperature is about 1300° C.

No references cited.